United States Patent
Araki

(10) Patent No.: US 8,786,869 B2
(45) Date of Patent: Jul. 22, 2014

(54) UPDATEABLE PRINTER DRIVER, INFORMATION PROCESSING APPARATUS, AND COMPUTER-READABLE RECORDING MEDIUM RECORDING THEREIN PRINTER DRIVER

(75) Inventor: Shigeo Araki, Tokyo (JP)

(73) Assignee: Ricoh Company, Limited, Tokyo (JP)

( * ) Notice: Subject to any disclaimer, the term of this patent is extended or adjusted under 35 U.S.C. 154(b) by 501 days.

(21) Appl. No.: 12/923,148

(22) Filed: Sep. 7, 2010

(65) Prior Publication Data

US 2011/0058205 A1 Mar. 10, 2011

(30) Foreign Application Priority Data

Sep. 7, 2009 (JP) ................. 2009-206303

(51) Int. Cl.
*G06F 3/12* (2006.01)
*G06F 3/03* (2006.01)

(52) U.S. Cl.
USPC .................... 358/1.13; 358/1.15; 719/321

(58) Field of Classification Search
None
See application file for complete search history.

(56) References Cited

U.S. PATENT DOCUMENTS

| | | | | |
|---|---|---|---|---|
| 6,031,527 | A * | 2/2000 | Shoji et al. ..................... 715/804 |
| 7,013,313 | B1 * | 3/2006 | LaRue ................................ 1/1 |
| 8,243,297 | B2 | 8/2012 | Kato | |
| 2003/0200427 | A1 * | 10/2003 | Kemp et al. ........................ 713/1 |
| 2005/0160159 | A1 * | 7/2005 | Zimmer et al. ................ 709/223 |
| 2006/0028667 | A1 * | 2/2006 | Saito ............................. 358/1.13 |
| 2007/0074181 | A1 * | 3/2007 | Zhanh et al. ................... 717/136 |
| 2010/0027043 | A1 * | 2/2010 | Kato ............................. 358/1.13 |
| 2010/0100807 | A1 | 4/2010 | Matsumoto et al. | |
| 2010/0235846 | A1 * | 9/2010 | Yamamichi .................... 719/327 |
| 2010/0238494 | A1 * | 9/2010 | Araki ............................. 358/1.15 |
| 2010/0309519 | A1 * | 12/2010 | Nishihara ..................... 358/1.15 |
| 2010/0318984 | A1 * | 12/2010 | Araki ............................. 717/174 |
| 2011/0063660 | A1 * | 3/2011 | Yamada ........................ 358/1.15 |

FOREIGN PATENT DOCUMENTS

| | | |
|---|---|---|
| JP | 2004-5608 | 1/2004 |
| JP | 2005-111710 | 4/2005 |
| JP | 2005-190467 | 7/2005 |
| JP | 2007-158929 | 6/2007 |
| JP | 2008-97215 | 4/2008 |
| JP | 2008-97574 | 4/2008 |
| JP | 2006-285666 | 10/2008 |

OTHER PUBLICATIONS

Office Action dated Jul. 9, 2013 for corresponding Japanese patent application No. 2009-206303.

\* cited by examiner

*Primary Examiner* — Vincent Rudolph
(74) *Attorney, Agent, or Firm* — Harness, Dickey & Pierce, P.L.C.

(57) ABSTRACT

A printer driver includes: a core driver performing a constraining process to a print setting based on function information containing a constraint for the print setting and stored in a storage unit, and being enabled to accept an addition of a plug-in, wherein the core driver expands basic function information corresponding to the core driver onto a memory as information having a tree structure, when plug-in function information corresponding to the plug-in is stored in the storage unit, the core driver expands the plug-in function information on the memory as information having a tree structure, the core driver merges the information expanded from the plug-in function information into the information expanded from the basic function information, and the core driver performs the constraining process to a print setting based on a parent-and-child relation in a tree structure of the information thus merged.

8 Claims, 20 Drawing Sheets

```
[
 {"type" : "ComboBox", "name" : "layout",
    "axis" : {
              "x":25, "y":30
         301  }
 },
 {"type" : "CheckBox", "name" : "booklet",
    "axis" : {
              "x":25, "y":60
              }
 },
          ⋮

]
```

LAYOUT DATA FOR AGGREGATE SETTING

LAYOUT DATA FOR BINDING SETTING

FIG. 5

```
{
        "devmode" :
        [
                        "layout",
                        "booklet",
                        ⋮
        ],
        "registory" :
        [
                        ⋮
        ]
}
```

FIG. 6

FUNCTION INFORMATION

```
<root>
    <item name="layout" priority="15">
        <pickone name="off"/>
        <pickone name="2in1"/>
        <pickone name="4in1"/>
    </item>

<item name="booklet" priority="20">
        <constraint fixvalue="off">
            <condition expression="layout != off"/>
        </constraint>
        <pickone name="off"/>
        <pickone name="on"/>
    </item>
</root>
```

FIG. 7

FUNCTION INFORMATION

```
<root>
  <item name="extended_layout" priority="10">
    <pickone name="off"/>
    <pickone name="9in1"/>
  </item>

<merge txpath="/item[@name=layout]">
    <constraint fixvalue="off">
      <condition expression="extended_layout != off"/>
    </constraint>
  </merge>

<merge txpath="/item[@name=booklet]">
    <constraint fixvalue="off">
      <condition expression="extended_layout != off"/>
    </constraint>
  </merge>
</root>
```

FIG. 8

```
<root>
  <item name="eco_mode" priority="5">
    <pickone name="off"/>
    <pickone name="normal"/>
    <pickone name="more">
      <constraint>
        <condition expression="extended_layout is nothing"/>
      </constraint>
    </pickone>
  </item>

<merge txpath="/item[@name=layout]">
    <constraint fixvalue ="4in1">
      <condition expression="eco_mode == normal"/>
    </constraint>
    <constraint fixvalue ="off">
      <condition expression="eco_mode == more"/>
    </constraint>
  </merge>

<merge txpath="/item[@name=extended_layout]">
    <constraint fixvalue ="9in1">
      <condition expression="eco_mode == more"/>
    </constraint>
  </merge>
</root>
```

FIG. 9

```
[ui_plugin]
extended_layout = extended_layout.dll

[graphic_plugin]
extended_layout = extended_layout.dll
eco_mode = eco_mode.dll
```

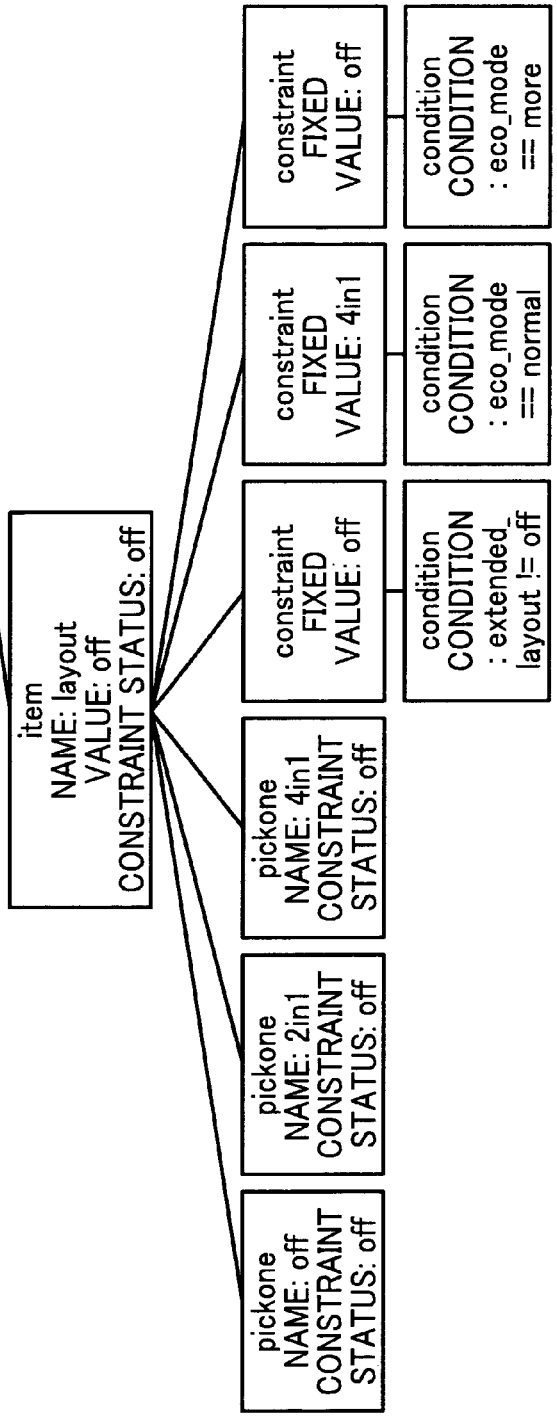

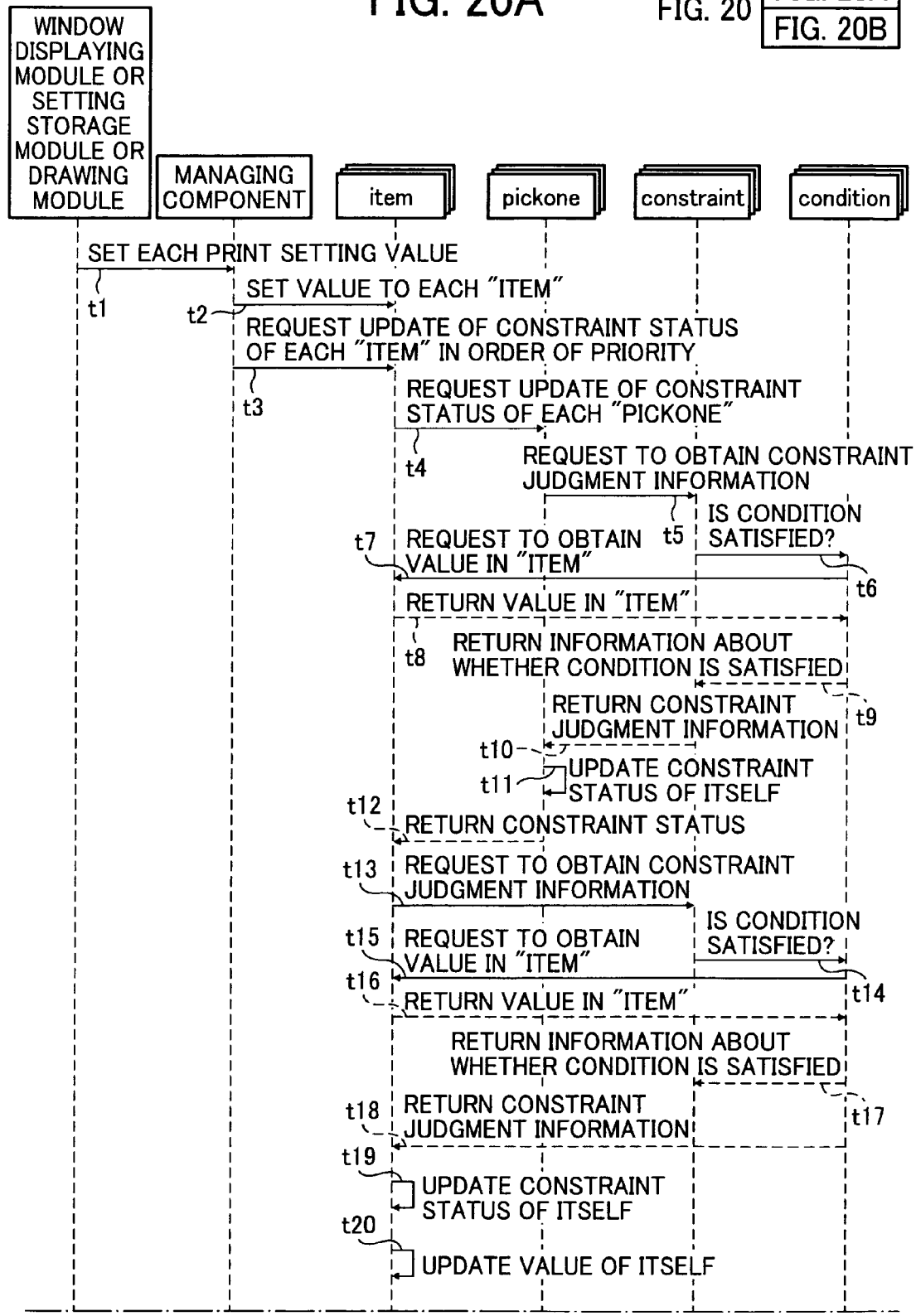

UPDATEABLE PRINTER DRIVER, INFORMATION PROCESSING APPARATUS, AND COMPUTER-READABLE RECORDING MEDIUM RECORDING THEREIN PRINTER DRIVER

CROSS-REFERENCE TO RELATED APPLICATIONS

The present application claims priority to and incorporates by reference the entire contents of Japanese Patent Application No. 2009-206303 filed in Japan on Sep. 7, 2009.

BACKGROUND OF THE INVENTION

1. Field of the Invention

The present invention relates to a printer driver, an information processing apparatus, and a computer-readable recording medium recording therein the printer driver whose functions are extendable through the addition of a plug-in to a core driver.

2. Description of the Related Art

Because image forming apparatuses, such as printers or multifunction products (MFP), are used in different office environments, they currently need to be customizable to make only necessary functions available. Therefore, printers, for example, allowing functions to be added later in time have been developed. However, when an additional function is added to such a printer, it is necessary to extend functions of a printer driver controlling the printer to make the added function usable.

At the same time, it is sometimes necessary to extend functions of a printer driver itself even if no additional function is added to the printer.

When the functions of the printer driver are to be extended, the manufacturer usually has to create a printer driver with its functions extended, and has to ask their customers to re-install the driver to their computer environments.

Therefore, a technique for adding functions to a printer driver without causing the manufacturer to create the printer driver with its functions extended and without causing the users to re-install the printer driver has been suggested. This is achieved by adding a computer program corresponding only to a function to be extended to the printer driver as a plug-in.

For example, in the technology for extending functions disclosed in Japanese Patent Application Laid-open No. 2004-005608, a device driver has provided with a means for detecting an addition of a plug-in, and the detected plug-in is activated by an event notification sent by the operating system. In this manner, functions can be extended dynamically without requiring the device driver to be re-installed.

However, because a core driver, which is at the core of a driver such as a printer driver, and a plug-in for adding a function are developed at different times, constraints (constraints among various settings, such as limitation in settings that are not permitted to be made simultaneously, for example) required in both of the core driver and the plug-in cannot be freely defined. In other words, a constraint in a plug-in cannot be added to a core driver developed earlier in time, and a constraint in a plug-in developed later in time cannot be added to a plug-in developed earlier in time.

SUMMARY OF THE INVENTION

It is an object of the present invention to at least partially solve the problems in the conventional technology.

According to one aspect of the present invention, there is provided a printer driver including: a core driver performing a constraining process to a print setting based on function information containing a constraint for the print setting and stored in a storage unit, and being enabled to accept an addition of a plug-in, wherein the core driver expands basic function information corresponding to the core driver onto a memory as information having a tree structure, when plug-in function information corresponding to the plug-in is stored in the storage unit, the core driver expands the plug-in function information on the memory as information having a tree structure, the core driver merges the information expanded from the plug-in function information into the information expanded from the basic function information, and the core driver performs the constraining process to a print setting based on a parent-and-child relation in a tree structure of the information thus merged.

According to another aspect of the present invention, there is provided an information processing apparatus installed with the printer driver mentioned above.

According to still another aspect of the present invention, there is provided a computer-readable recording medium recording therein the printer driver mentioned above.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 5 is a schematic of an example of storage location information (only a part thereof) for a core driver;

FIG. 6 is a schematic of an example of function information for the core driver;

FIG. 7 is a schematic of an example of function information for an aggregation extending plug-in;

FIG. 8 is a schematic of an example of function information for an eco-mode plug-in;

FIG. 9 is a schematic of plug-in information after the aggregation extending plug-in and the eco-mode plug-in are added;

FIG. 10 is a block diagram of a configuration of an aggregation extending plug-in installer for installing the aggregation extending plug-in;

DETAILED DESCRIPTION OF THE PREFERRED EMBODIMENTS

An exemplary embodiment of a printer system according to the present invention is described below in greater detail with reference to the accompanying drawings.

Overall Configuration of Printer System

Figure 1:
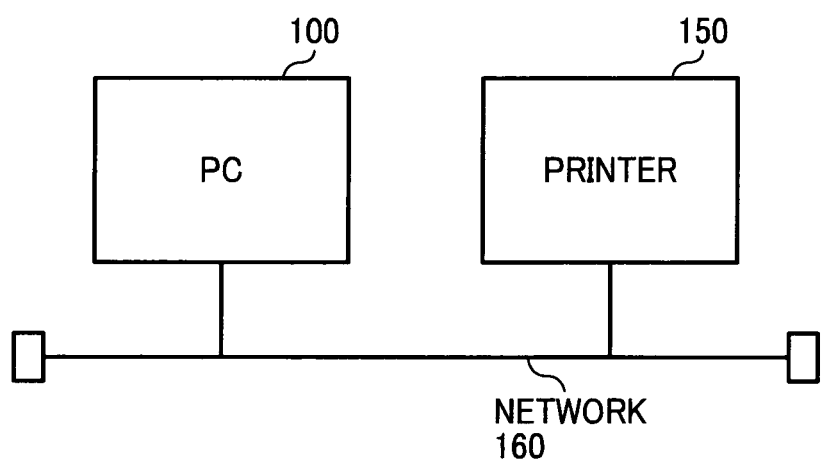
FIG. 1 is a schematic of an overall configuration of a printer system according to an embodiment of the present invention.

FIG. 1 is a schematic of an overall configuration of a printer system according to an embodiment of the present invention. As illustrated in FIG. 1, in this embodiment, a personal computer (PC) 100 and a printer 150 are connected via a network 160. The printer 150 executes printing in response to a print request issued by the PC 100.

Configuration of PC 100

Figure 2:
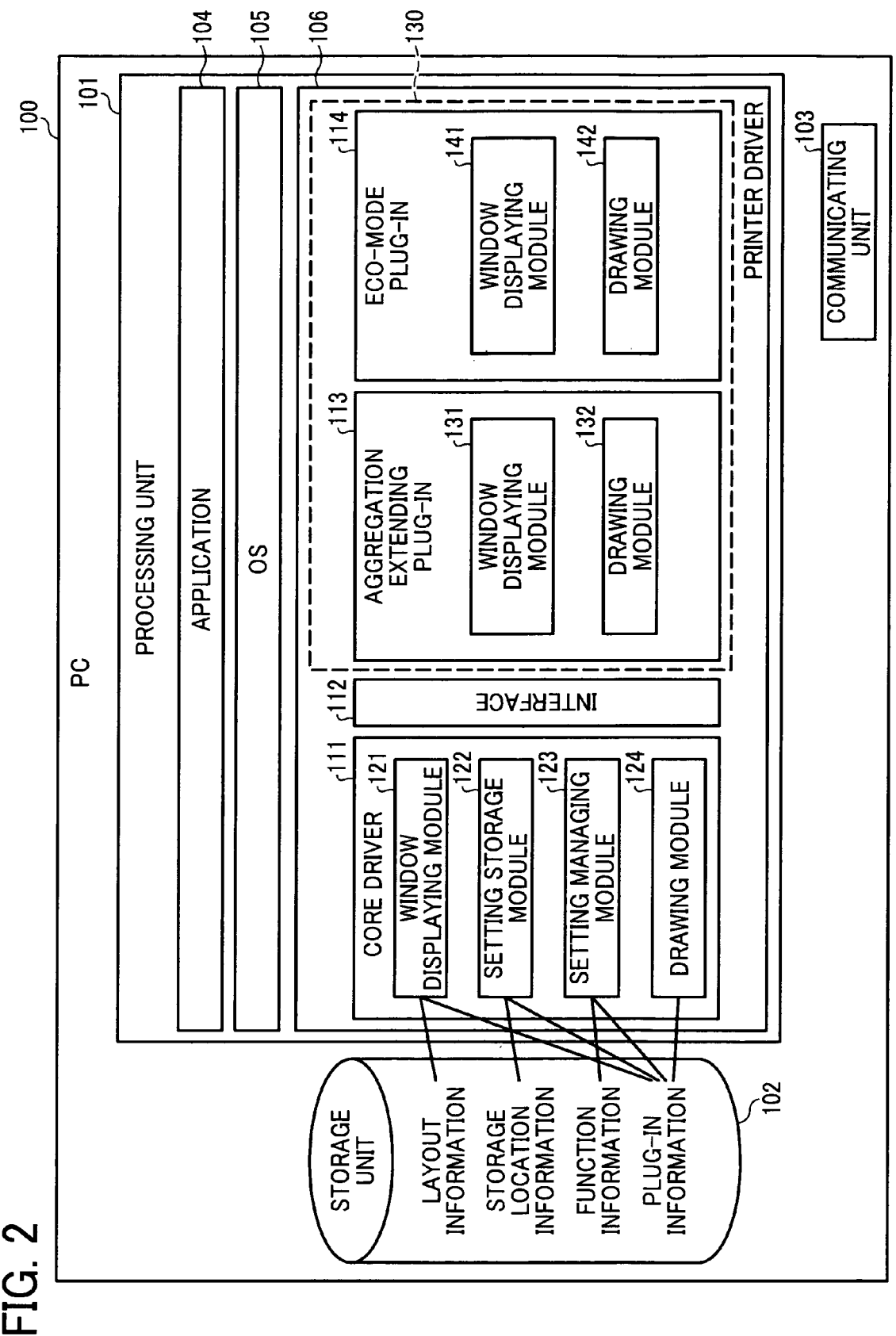
FIG. 2 is a block diagram of a configuration of a PC according to the embodiment.

FIG. 2 is a block diagram of a configuration of the PC 100. As illustrated in FIG. 2, the PC 100 includes a processing unit 101, a storage unit 102, and a communicating unit 103. The processing unit 101 includes a central processing unit (CPU), not illustrated, as a controller, and a set of memories including a read-only memory (ROM) and a random access memory (RAM) functioning as a main memory. When the PC 100 is booted and executed, an application 104, an operating system (OS) 105, and various drivers (only a printer driver 106 is illustrated in FIG. 2) are loaded from the ROM and the storage unit 102 onto the main memory and expanded thereon, and executed by the CPU. The PC 100 has a hardware configuration of a common computer with an input device such as a keyboard or a mouse, and an output device such as a display, which are not illustrated in FIG. 2 for simplicity of explanations.

The functional blocks included in the printer driver 106 illustrated in FIG. 2 represent functions or means for controlling the printer 150. Especially, a core driver 111 is the core of the printer driver 106, and has basic functions of a printer driver. On the contrary, each plug-in (only an aggregation extending plug-in and an eco-mode plug-in are illustrated in FIG. 2) is a computer program for extending functions of the printer driver 106 having only the core driver 111, and makes up the printer driver 106 (with the functions extended) together with the core driver 111 (details will be described later).

The communicating unit 103 exchanges information with the printer 150 connected over the network 160.

The application 104 is software allowing a user to give a print instruction. If the user wishes to print data edited on the application 104, the application 104 accepts the printer instruction issued by the user. At this time, the application 104 does not alone generate print data to be sent to the printer 150, but passes information to be printed along with a print request corresponding to the print instruction to the OS 105.

The OS 105 is a computer program for managing hardware and software on the PC 100. The OS 105 performs controls such as starting a computer program, or reading or storing information, and the like. Well-known examples of the most typical OSes include Microsoft Windows (registered trademark) and UNIX (registered trademark).

The OS 105 passes information to be printed (e.g., document data or image data) as well as the print request received from the application 104 to the printer driver 106.

The storage unit 102 is a storage for storing therein various information. More specifically, the storage unit 102 is a hard disk drive (HDD), for example. The information stored in the storage unit 102 includes setting information defining information (any information required in the process, such as a setting value used for the process, or display information allowing a user to change a setting value) associated with some part of a process for realizing a particular function (e.g., an extended aggregation function or an eco-mode function) of the core driver 111 or each of the plug-ins. Examples of the setting information include layout information, storage location information, function information, and plug-in information.

The layout information is information describing a layout of a graphical user interface (GUI) component to be displayed on a setting window. The storage location information is information specifying information about the location where each of the settings is stored. The function information is information specifying information related to a range in which each of the setting values is permitted to be set, or constraints among the settings. These types of information will be described in detail later. The plug-in information is information providing a description about an added plug-in.

The printer driver 106 includes a core driver 111, an interface (I/F) 112, and plug-ins of an aggregation extending plug-in 113 and an eco-mode plug-in 114. Needless to say, the example illustrated in FIG. 2 is just an example, and any plug-in can be added.

The core driver 111 has standard functions of the printer driver 106. The core driver 111 also includes a window displaying module 121, a setting storage module 122, a setting managing module 123, and a drawing module 124, as a set of modules for executing the functions of the printer driver 106. To check for an installed plug-in, the window displaying module 121, the setting storage module 122, and the setting managing module 123 of the core driver 111 refer to the plug-in information. In this manner, the core driver 111 can check for an installed plug-in.

The set of modules included in the core driver 111 executes not only standard printing processes, but also some processes that cannot be executed by modules of an installed plug-in, on behalf of such a plug-in, following the setting information (the layout information, the storage location information, the function information, and the plug-in information). An installer for a plug-in adds descriptions to the setting information stored in the storage unit 102, so that the window displaying module 121, the setting storage module 122, the setting managing module 123, and the drawing module 124 included in the core driver 111 can refer to the added setting information to perform such processes on behalf of the plug-in. The layout information, the storage location information, and the plug-in information for each plug-in are respectively added to the layout information, the storage location information, and the plug-in information for the core driver 111. The function information for the core driver 111 and the function information for each plug-in are stored in the storage unit 102 as independent files. Basic information for the core driver 111 and the function information for a plug-in are simply referred to as basic function information and plug-in function information, respectively, hereunder.

The window displaying module 121 displays a print setting window functioning as a GUI allowing user to specify print settings. The window displaying module 121 according to the embodiment displays a print setting window and the like based on the layout information stored in the storage unit 102.

The setting storage module 122 stores each setting value managed by the setting managing module 123 in a data storage area, such as Devmode or a registry in the OS 105. Upon storing a setting value, the setting storage module 122 refers to the storage location information stored in the storage unit 102 to determine the storage location for the setting value. The Devmode is a structure provided by the OS 105 for maintaining various printing related settings.

The setting managing module 123 manages settings (setting values or constraints among the settings) used for a printing process based on the function information for the core driver 111 and the function information for each of the plug-ins stored in the storage unit 102. In this embodiment, specifically, the setting managing module 123 merges a document object model (DOM) tree generated from the function information, describing information related to each setting in the core driver 111 in the Extensible Markup Language (XML) format, into a DOM tree generated from the function information maintained for each plug-in, and manages the setting values, the constraints among the settings, and the like according to the merged DOM tree (the details will be explained later). The setting managing module 123 also refers to the storage location information stored in the storage unit 102, and reads each of the setting values stored in each of the storage locations to perform settings required in the printing process.

The drawing module 124 converts data requested by the application 104 to have printed into a print instruction interpretable by the printer. The drawing module 124 then transmits the converted print instruction to the printer 150 via the communicating unit 103.

The I/F 112 is an interface for accepting an addition of a plug-in. When a plug-in is added to the printer driver 106, the core driver 111 can call each module included in the added plug-in via the I/F 112. The added plug-in can also call each of the modules included in the core driver 111 via the I/F 112.

The aggregation extending plug-in 113 and the eco-mode plug-in 114 surrounded by a dotted line 130 in FIG. 2 are plug-ins that are configured as dynamic link libraries (DLL) for adding functions to the core driver 111. The plug-ins include one or more modules for realizing predetermined functions. While each of the plug-ins illustrated in FIG. 2 includes a window displaying module and a drawing module a plug-in may have any configuration.

Window displaying modules (131 and 141) of the plug-ins display a setting window related to a function included in the plug-ins, following a display instruction issued by the window displaying module 121 of the core driver 111 via the I/F 112. Drawing modules (132 and 142) of the plug-ins execute a drawing function using functions included in the plug-ins, following a drawing instruction issued by the drawing module 124 of the core driver 111 via the I/F 112.

In other words, extended portions of the window displaying module 121 of the core driver 111 correspond to the window displaying modules of the plug-ins, and extended portions of the drawing module 124 of the core driver 111 correspond to the drawing modules of the plug-ins.

Depending on an added plug-in, the plug-in can utilize the modules of the core driver 111 (the window displaying module 121 and the drawing module 124). In other words, the core driver 111 executes functions on behalf of the plug-in, so that it is not necessary to create every module for the plug-in. In this manner, plug-in development efforts can be alleviated.

To allow the modules of the core driver 111 to execute some functions required in a plug-in on behalf of such a plug-in, external files referred by each of the modules of the core driver 111 need to be updated. In other words, a plug-in is allowed to function as a plug-in simply by providing an additional module unique to the plug-in with a function not provided by the core driver 111, and updating the setting information referred by each of the modules of the core driver 111.

A plug-in is added to the printer driver 106 according to the embodiment by adding a DLL of the plug-in itself, and by adding descriptions to one or more of the layout information, the storage location information, and the plug-in information, and by adding the function information. In this manner, a plug-in can be easily added to the printer driver 106 that has been already installed to the PC 100. In other words, a user is no longer required to re-install the printer driver itself. A process of how the function information is added upon adding a plug-in is a feature of the embodiment, and will be explained later in detail.

The setting information (the layout information, the storage location information, the function information, and the plug-in information) will now be explained with specific examples.

Layout Information

Figures 3, 4:
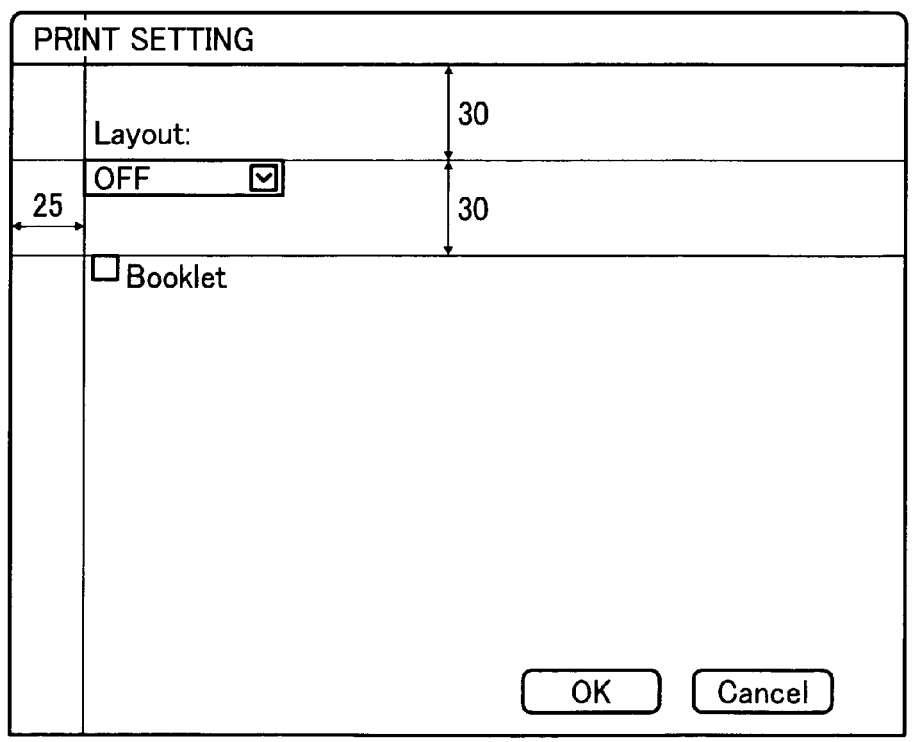
FIG. 3 is a schematic of an example of layout information.
FIG. 4 is a schematic of an example of a print setting window displayed based on the layout information illustrated in FIG. 3.

FIG. 3 is a schematic of an example of the layout information. The layout information illustrated in FIG. 3 is the layout information for the core driver 111, and only a part thereof is illustrated. When a plug-in is added, a description about the added plug-in is added to the layout information. The layout information illustrated in FIG. 3 is described in the JavaScript Object Notation (JSON) format, but may be described in any other format.

As illustrated in FIG. 3, in the layout information, layout data is specified for each GUI component to be displayed in the print setting window. The layout data has attributes of a type, a name, and an axis.

The type specifies a type of a GUI component. "ComboBox", which is a value of the type, specifies that the GUI component is displayed as a combo box component. CheckBox specifies that the GUI component is displayed as a check box component. A GUI component may also be displayed as a spin box component or an edit box component, although not illustrated, by specifying SpinBox or EditBox in the type.

The name represents the name of a setting. Out of the values of the name, "layout" indicates that the setting is for an aggregate setting. "Booklet" indicates that the setting is for specifying a binding setting (binding at the center). "Papersize" or "copies", not illustrated, may also be described to specify a setting for a paper size or the number of copies.

The axis represents the coordinates at which the GUI component is displayed. "x", which is an attribute of the axis, indicates a horizontal coordinate with the point of origin at the upper left corner of the dialog box, and "y", which is also an attribute of the axis, indicates a vertical coordinate with the point of origin at the upper left corner of the dialog box. For example, an axis 301 in the aggregate setting illustrated in FIG. 3 specifies that the combo box component, specified by the type attribute, is displayed at a horizontal position of 25 and a vertical position of 30.

The window displaying module 121 reads the layout information from the storage unit 102, generates a setting window corresponding to the read layout information, and displays the generated setting window onto a display apparatus (not illustrated) on the PC 100. At this time, the window displaying module 121 only displays the GUI components permitted to be set based on the function information, which is described later, managed by the setting managing module 123 among the GUI components described in the layout information.

FIG. 4 is a schematic of an example of a print setting window displayed by the window displaying module 121 of the core driver 111 reading the layout information illustrated in FIG. 3. The combo box component is displayed under the display name "Layout" for the aggregate setting, and a check box component is displayed under a display name "Booklet" for the binding setting. The OK button illustrated in FIG. 4 is a button for storing the modified print settings, and the Cancel button is for cancelling such modifications.

Storage Location Information

The storage location information describes therein information specifying a storage location for each of the settings. FIG. 5 illustrates an example of the storage location information for the core driver 111, illustrating only a part thereof. When a plug-in is added, a description about the added plug-in is added to the storage location information. In the example illustrated in FIG. 5, the storage location information is described in the JSON format, but may be described in any other format.

In the storage location information, the name of each of the settings described in sections under keys "Devmode" and "registry" corresponds to the name of each of the settings specified in the layout information and the function information. The setting corresponding to the name of each of the settings described under the key "Devmode" is stored in the Devmode structure. The setting corresponding to the name of each of the settings described under the key "registry" is stored in the registry. Each of the stored setting represents a setting value managed by the setting managing module 123.

Function Information for Core Driver

FIG. 6 is a schematic of an example of the function information for the core driver 111. In FIG. 6, to simplify explanations, only aggregate setting (layout) and the binding setting (booklet) are illustrated. However, the function information is the information for specifying a range of setting values permitted to be set for each of the setting values, and constraints among the settings. In practice, various types of information related to printing, such as a paper size setting or a copy number setting, is described in the function information. The function information illustrated in FIG. 6 is described in the XLM format, but may be described in any other format (e.g., JSON).

In the example of the function information illustrated in FIG. 6, each piece of setting information is defined by an "item" tag. The "item" tag has attributes of a name and a priority. Needless to say, the example illustrated in FIG. 6 is just an example, and other attributes may also be defined and used.

The attribute "name" represents the name of the setting, and corresponds to the name in the layout information. In the example illustrated in FIG. 6, the value "layout" in the attribute "name" specifies that the setting is for the aggregate setting, and the value "booklet" specifies that the setting is for the binding setting. The attribute "priority" specifies a priority at which the constraint is inspected. In the ascending order of the priorities, each of the settings is inspected against a constraint.

The "constraint" tag may be specified in a section enclosed by the "item" tags, like a binding setting 501 illustrated in FIG. 6. The section described using the "constraint" tags is the constraint information for the setting specified in the "item" tag, which is their parent tag. The "fixvalue", which is an attribute in the "constraint" tag, represents a setting value forcibly changed thereto when a constraining condition is met.

A constraining condition can be specified using a "condition" tag in the section enclosed by the "constraint" tags, like in the binding setting (booklet) illustrated in FIG. 6. The "condition" tag specifies a constraining condition for the "constraint" tag, which is a parent tag, and an "expression" that is an attribute of the "condition" tag specifies such a condition.

The binding setting illustrated in FIG. 6, for example, satisfies the constraining condition, if the "layout" (aggregate setting) is other than "off". If the condition is satisfied, the setting value of the "booklet" (binding setting) is forcibly changed to "off".

The "pickone" tag indicates that the setting values can be selected, and such setting values are specified under the attribute "name" in the "pickone" tag. Although not illustrated in FIG. 6, the "constraint" tag may also be specified in a section enclosed by the "pickone" tags, and in a "pickone" tag itself, in other words, the alternatives themselves can have the constraint information.

As possible values of the name that is an attribute of the "pickone" in the aggregate setting, "off" indicates that the function is kept off, "2in1" indicates that two pages are printed in one sheet, and "4in1" indicates that four pages are printed in one sheet. In the binding setting, "off" indicates that the function is off, and "on" indicates that the function is on.

Function Information for Aggregation Extending Plug-In

FIG. 7 is a schematic of an example of the function information for the aggregation extending plug-in. The aggregation extending plug-in has a function for extending the function of the aggregation. The "item" tag, immediately below the "root" tag, and the portions thereunder illustrated in FIG. 7 have the same meaning as the "item" tag and the corresponding portions of the function information for the core driver 111. Each of the attributes basically has the same meaning as the one in the function information for the core driver 111 (the same can be said in any other plug-ins).

The name attribute "extended_layout" illustrated in FIG. 7 indicates that it is the extended aggregate setting. The extended aggregate setting has alternatives of "off" and "9in1". This plug-in having the alternative "9in1" enables nine pages to be printed in one sheet. A "merge" tag is a tag specifying that a section enclosed by the "merge" tags is added to (merged into) an existing tag (an XML node). "txpath" that is an attribute of the "merge" tag is written in the well-known XML Path Language (XPath). For example, "/item[@name=layout]" in the first "merge" tag means that the section enclosed by the "constraint" tag is added to an "item" having the name attribute "layout", as a child node. In other words, it means that a constraint "to be off if the extended aggregate setting is other than off" is added to the aggregate setting. In a similar manner, the second "merge" tag has a meaning that a constraint "to be off if the extended aggregate setting is other than off" is added to the binding setting. These constraints are added because the aggregate setting or the binding setting must be off if the extended aggregate setting is not "off".

Function Information for Eco-Mode Plug-In

FIG. 8 is a schematic of an example of the function information for the eco-mode plug-in. The eco-mode plug-in adds a function for promoting paper or toner reductions to the printer driver 106.

The name attribute "eco mode" illustrated in FIG. 8 indicates the eco-mode setting. The eco-mode is a function that promotes paper or toner reduction. The eco-mode setting illustrated in FIG. 8 has alternatives for "off", "reduce", and "reduce more". The "normal" in FIG. 8 means to "reduce", and the "more" means to "reduce more".

"<condition expression="extended_layout is nothing"/>" indicates that such a condition is satisfied when the extended aggregate setting itself is not present. When the "constraint" tag and the "condition" tag are appended below the "pickone" tag, as illustrated in the eco-mode setting in FIG. 8, it means that, when the condition of the constraint is satisfied, such an alternative cannot be selected (such an alternative will not be displayed or will be grayed out in a setting window).

In the eco-mode, when the "reduce" is selected, the aggregate setting is set to "4in1" and the toner consumption is set to be reduced. Therefore, the aggregate setting must be changed to "4in1" as a constraint. When the "reduce more" is selected, the extended aggregate setting is set to "9in1" and the toner consumption is set to be reduced. Therefore, the extended aggregate setting must be changed to "9in1" as a constraint. On the contrary, when the extended aggregate setting is not available (the aggregation extending plug-in is not installed), the alternative of the "9in1" is not available. Therefore, it is necessary to prevent the "reduce more" from being selected.

Therefore, by means of the description enclosed by the first "merge" tags illustrated in FIG. 8, a constraint "to change to 4in1 when the eco-mode setting is 'reduce'" and a constraint "to turn off when the eco-mode setting is 'reduce more'" are added to the aggregate setting. In addition, by means of the description enclosed by the second "merge" tags, a constraint "to change to 9in1 when the eco-mode setting is 'reduce more'" is added to the extended aggregate setting.

As described above, the function information, which is one of the setting information, is configured for each of the core driver 111, the aggregation extending plug-in 113, and the eco-mode plug-in 114. In the embodiment, it is assumed that each of the plug-ins is developed after the core driver 111 is created. Therefore, no information about each of the plug-ins is included in the function information for the core driver 111. It is also assumed that the aggregation extending plug-in is developed before the eco-mode plug-in. Therefore, no information about the eco-mode plug-in is included in the function information for the aggregation extending plug-in. The same can be said for other setting information (the layout information and the storage location information).

As described above, the function information describes therein information for allowing the setting managing module 123 of the core driver 111 to manage each of the print related settings. The function information for the core driver 111 and the function information for each of the plug-ins are respectively stored as independent XML files in the storage unit 102.

When software so-called DOM parser is used to read the XML file, a data structure called a DOM tree is generated onto the memory. The printer driver 106 according to the embodiment is configured to cause the DOM parser to analyze the function information (XML files), to generate DOM trees, and merges the generated DOM tress (detailed explanations will be provided later). The printer driver 106 then accesses the merged DOM tree to generate software components required in a constraining process on the memory. A constraining process is a process in which the constraints specified in the function information are applied to each of the settings. The setting managing module 123 having the generated software components performs the constraining process to the setting values to determine setting for a printing process.

Plug-In Information

FIG. 9 is a schematic of the plug-in information after the aggregation extending plug-in 113 and the eco-mode plug-in 114 are added. The plug-in information may be described in any format, but in the embodiment, an "ini" format is used.

The plug-in information illustrated in FIG. 9 has two scopes of "ui_plugin" corresponding to the window displaying module and "graphic_plugin" corresponding to the drawing module.

The "ui_plugin" maintains therein the name of each of the plug-ins having a window displaying module, in the manner associated to the file name of a DLL that is the actual entity of the window displaying module included in each of the plug-in. Using the file name of each of the plug-ins described in the "ui_plugin", the window displaying module 121 of the core driver 111, for example, can call the window displaying module included in the each of the plug-ins. In other words, the window displaying module of a plug-in is called only by the window displaying module 121 in the core driver 111.

The "graphic_plugin" maintains therein the name of each of the plug-ins having a drawing module, in the manner associated to the file name of a DLL that is the actual entity of the drawing module included in each of the plug-ins. By specifying the file name of each of the plug-ins described in the "graphic_plugin", the drawing module 124 in the core driver 111 can call the drawing module included in each of the plug-ins. In other words, the drawing module in a plug-in is called only by the drawing module 124 in the core driver 111.

In the example of the plug-in information illustrated in FIG. 9, the same DLL file is specified as the actual entities of the modules in the aggregation extending plug-in 113. However, when a plug-in includes a plurality of DLLs, individual DLLs are specified according to the structure thereof.

Plug-In Installer

Figure 10:
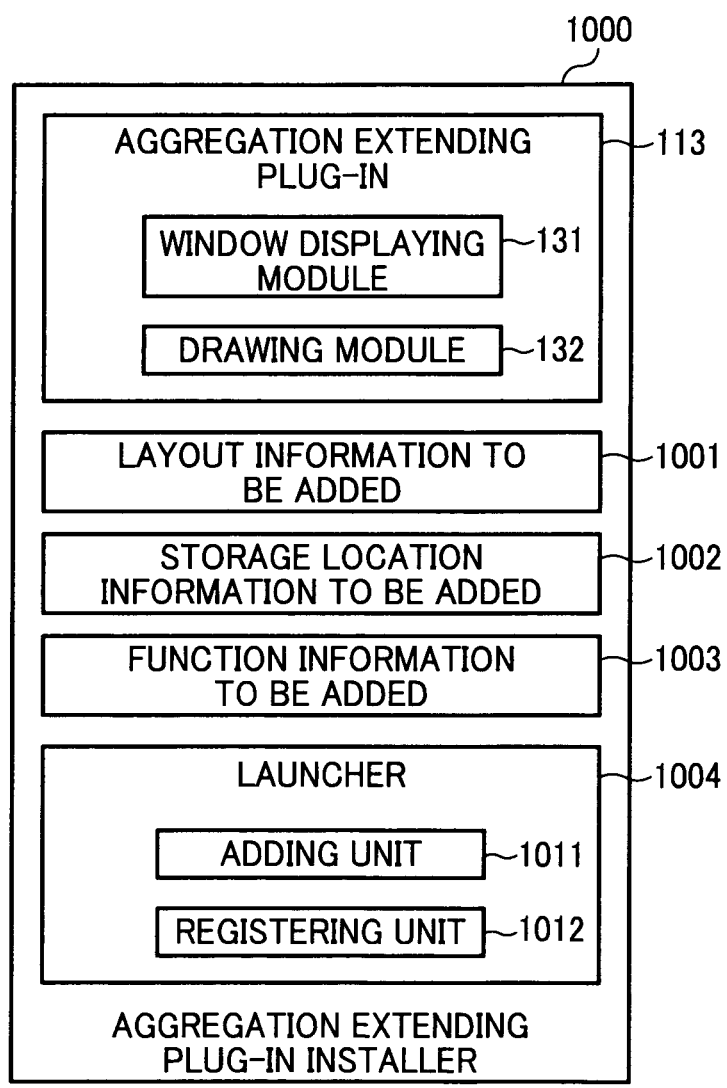

An installer for adding a plug-in will now be explained. FIG. 10 is a block diagram of a configuration of an aggregation extending plug-in installer 1000 for installing the aggregation extending plug-in 113. As illustrated in FIG. 10, the aggregation extending plug-in installer 1000 includes the aggregation extending plug-in 113, layout information to be added 1001, storage location information to be added 1002, function information to be added 1003, and a launcher 1004.

The layout information to be added 1001 stores therein information to be added to the layout information stored in the storage unit 102, to realize the functions of the aggregation extending plug-in 113. The storage location information to be added 1002 stores therein information to be added to the storage location information stored in the storage unit 102, to realize the functions of the aggregation extending plug-in 113. The function information to be added 1003 is the function information about the aggregation extending plug-in 113, and is managed as an independent file even after being installed, unlike the layout information to be added 1001 and the storage location information to be added 1002. The layout information to be added 1001 and the storage location information to be added 1002 are respectively described in the same format as the layout information and the storage location information for the core driver 111 (e.g., JSON format), and the function information to be added 1003 is described in the same format as the function information for the core driver 111 (e.g., XML format).

The launcher 1004 includes an adding unit 1011 and a registering unit 1012, and controls an installing process of the plug-in. More specifically, when the user launches the aggregation extending plug-in installer 1000, the launcher 1004 adds the aggregation extending plug-in to the printer driver 106.

The adding unit 1011 adds the information to be added (the layout information to be added, the storage location information to be added, and the function information to be added) to the respective setting information (the layout information, the storage location information, and the function information) stored in the storage unit 102.

The registering unit 1012 registers the file names of modules of the added plug-in to each of the scopes in the plug-in information stored in the storage unit 102.

The aggregation extending plug-in installer 1000 is explained above as an example. However, an installer for another plug-in also has a main plug-in, information to be added, and a launcher.

Plug-In Installing Process

Figure 11:
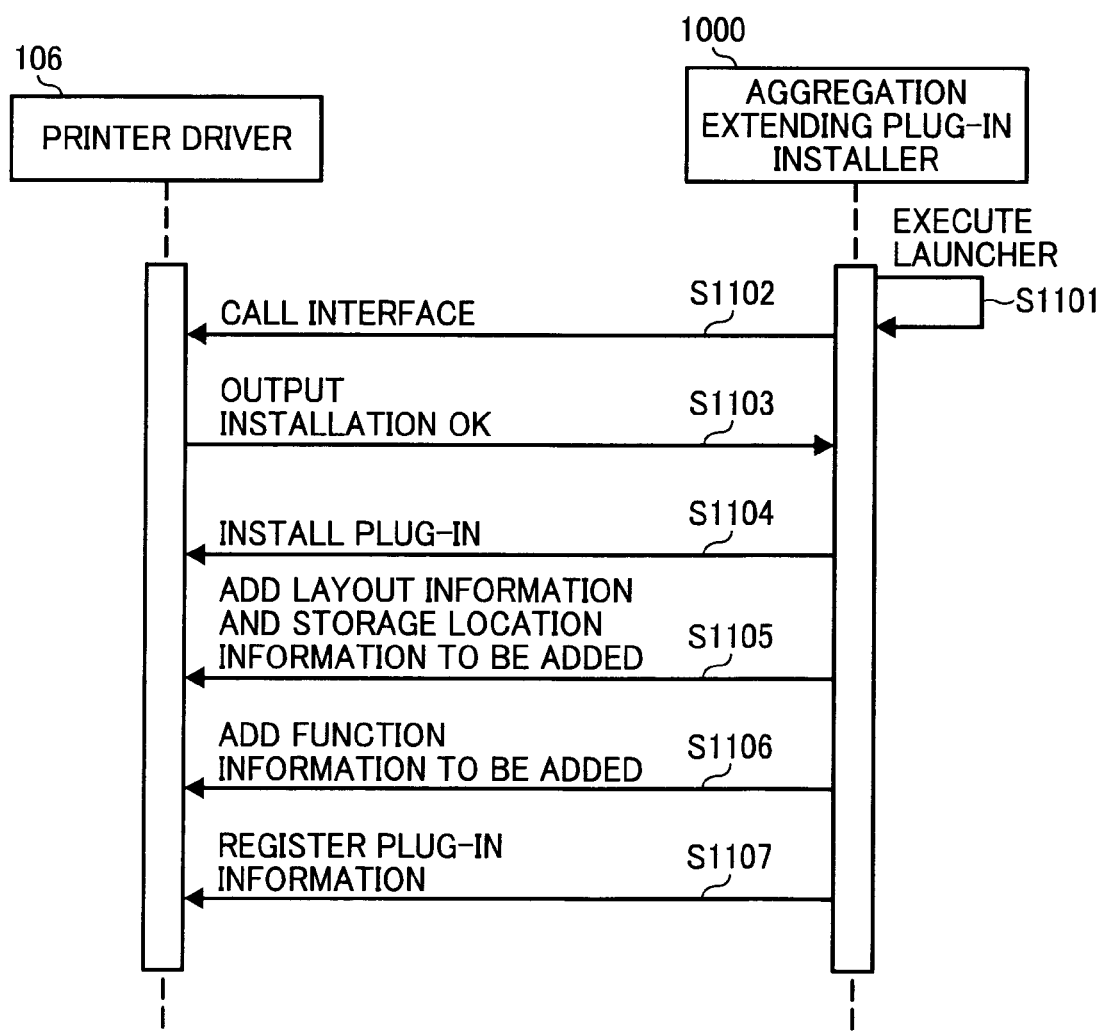
FIG. 11 is a flowchart of a process performed by the aggregation extending plug-in installer.

A plug-in installing process using the aggregation extending plug-in installer 1000 according to the embodiment will now be explained with reference to the flowchart illustrated in FIG. 11. FIG. 11 is a flowchart of the process performed by the aggregation extending plug-in installer 1000 in the PC 100 according to the embodiment.

When the user makes an operation to execute the aggregation extending plug-in installer 1000, the launcher 1004 is launched (Step S1101).

The launcher 1004 then calls the I/F 112 from the printer driver 106 (Step S1102). The I/F 112 then outputs a notification of an installation OK to the aggregation extending plug-in installer 1000 (Step S1103).

The aggregation extending plug-in installer 1000 then installs (copies) the modules, corresponding to the window displaying module 131 and the drawing module 132 included in the plug-in, into an install directory storing therein the driver to which the plug-in is added (Step S1104).

The adding unit 1011 included in the aggregation extending plug-in installer 1000 adds (writes to add) the layout information to be added 1001 and the storage location information to be added 1002 for the aggregation extending plug-in into the layout information and the storage location information, respectively, referred by the core driver 111 of the printer driver 106 (Step S1105).

The adding unit 1011 also stores the function information to be added 1003 for the aggregation extending plug-in 113 into a predetermined storage location in the storage unit 102 where the function information for the core driver 111 is stored, as the function information consisting of a single file (Step S1106).

The registering unit 1012 then registers the file names of the DLLs corresponding to the window displaying module 131 and the drawing module 132 of the aggregation extending plug-in 113 into the plug-in information referred by the core driver 111 in the printer driver 106 (Step S1107).

The installation of the aggregation extending plug-in 113 is completed by the steps described above. However, these steps are just an example, and the sequence of the steps and the like are not limited thereto.

A configuration of the setting managing module 123 in the core driver 111 and a component generation performed thereby will now be explained, correspondingly to the function information.

In this embodiment, software called a DOM parser is used to read the function information described in the XML format, to generate data structures referred to as DOM trees onto the memory. The generated DOM trees are then merged, and each of the components of the setting managing module 123 required in the constraining process is generated on the memory based on the merged DOM tree.

DOM Tree

Figure 12:
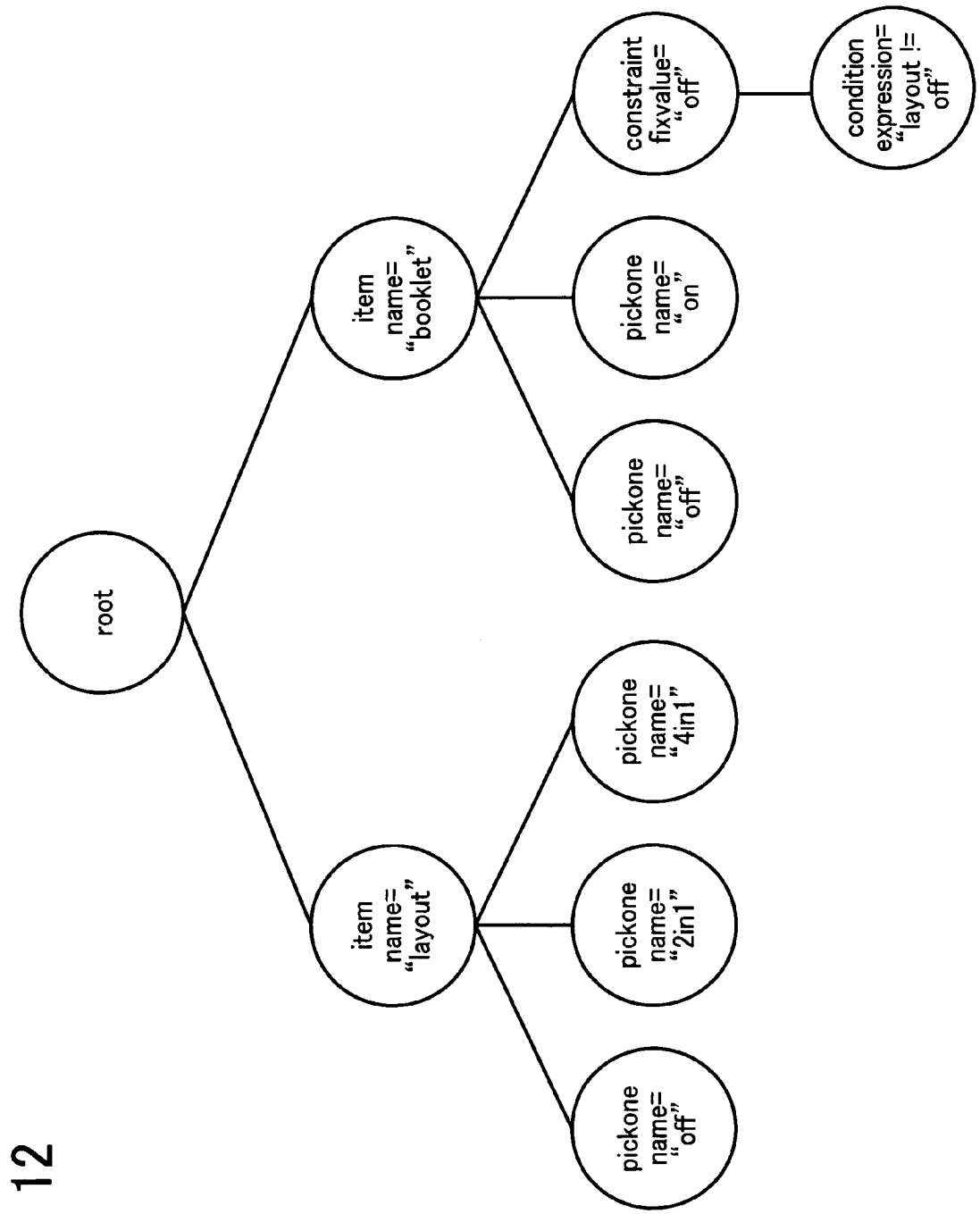
FIG. 12 is a schematic of a DOM tree corresponding to the function information for a core driver 111 (FIG. 6)

FIG. 12 is a schematic of a DOM tree corresponding to the function information for the core driver 111 (FIG. 6). As illustrated in FIG. 12, a node in a DOM tree is generated for each of the tags included in the function information described in the XML format. In other words, a root node is generated from the "root" tag, an item node is generated from the "item" tag, a pickone node is generated from the "pickone" tag, a constraint node is generated from the "constraint" tag, and a condition node is generated from the "condition" tag.

Figure 13:
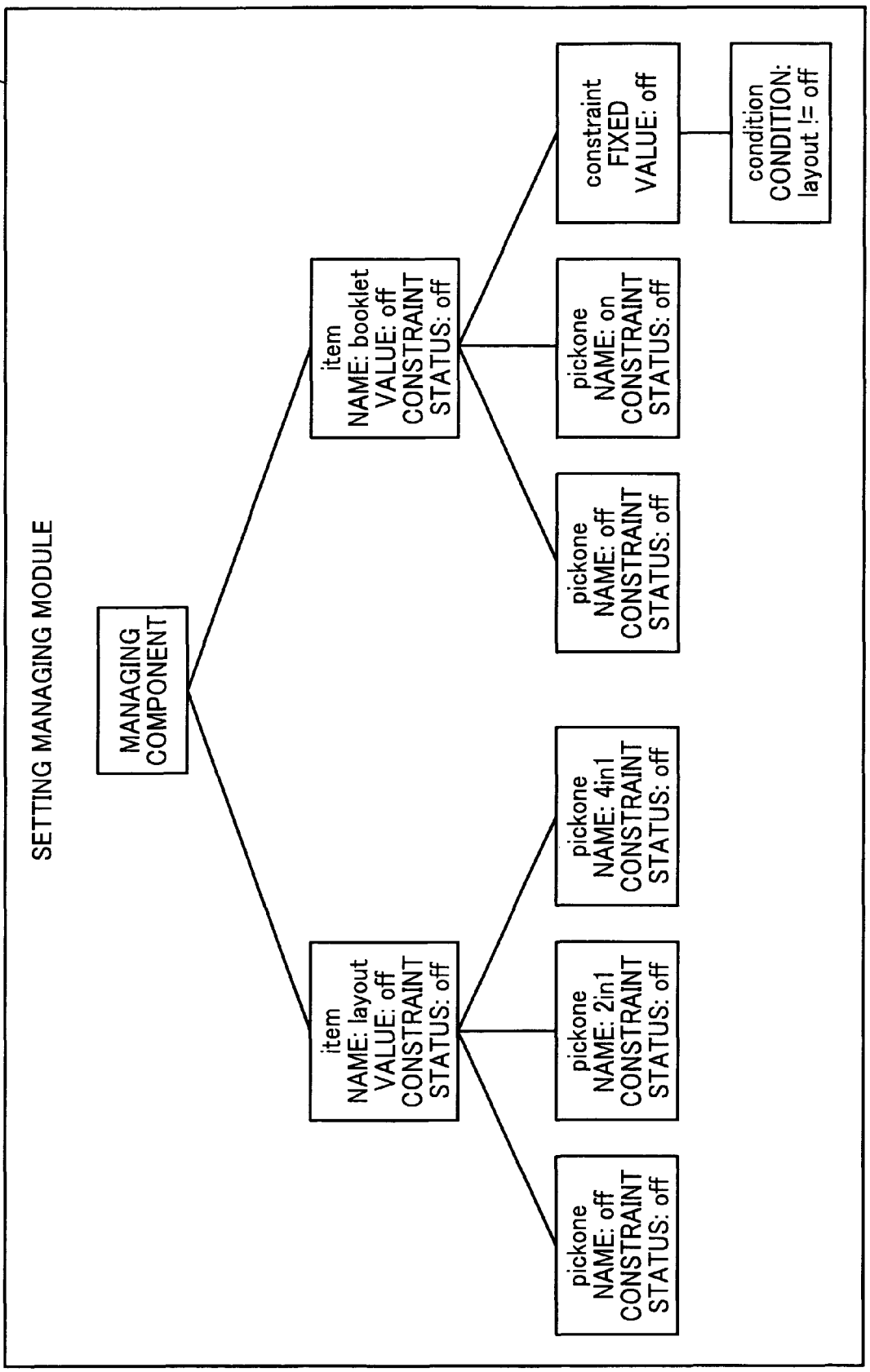
FIG. 13 is a schematic of an initial structure of a setting managing module of the core driver before any plug-in is added.

FIG. 13 is a schematic of an initial structure of the setting managing module 123 of the core driver 111 before any plug-in is added. A managing component is a component that manages each "item" component, and generated only in singularity. The managing component also acts as an interface between other modules (the window displaying module 121, the setting storage module 122, and the drawing module 124).

An item component is a component generated from an item node, and maintains a setting name, a current value, and a constraint status for the item component itself. The item component may have a pickone component and a constraint component belonging thereto. The name of a pickone component, which is a child component of the item component, represents a possible value (an alternative) that the item component can take. A value in the constraint component represents information about a constraint relating to the item component (fixed value: fixvalue).

A pickone component is a component generated from a pickone node, and maintains therein the name of the pickone component itself and a constraint status. Although not illustrated in FIG. 13, a pickone component may have a constraint component belonging thereto. Data in such a constraint component represents information about a constraint relating to the pickone component.

A constraint component is a component generated from a constraint node, and maintains a value that the parent item component should take when a constraint included in the constraint component is satisfied (in other words, when a condition specified in the child condition component is satisfied).

A condition component has a conditional expression (a constraining condition) acting as a basis of the constraint. When a condition included in a condition component is satisfied, the constraint component returns information indicating that the constraint status has been satisfied (on) to an item component or a pickone component. The constraint status of each of these components is changed accordingly. The constraint status included in an item component or a pickone component takes an initial value (off) before the constraining process is executed.

Figure 14:
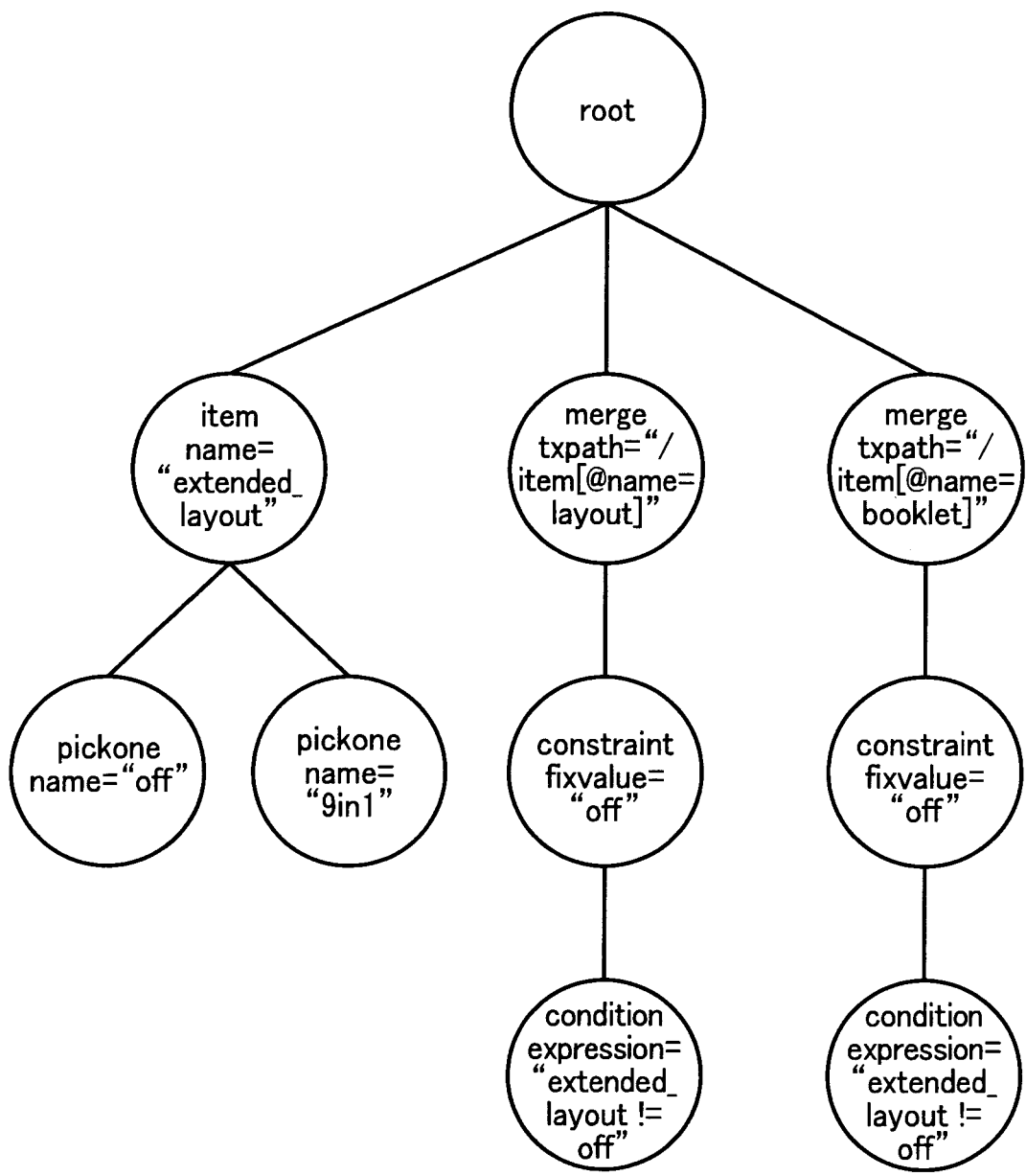
FIG. 14 is a schematic of a DOM tree corresponding to the function information for the aggregation extending plug-in (FIG. 7)
Figure 15:
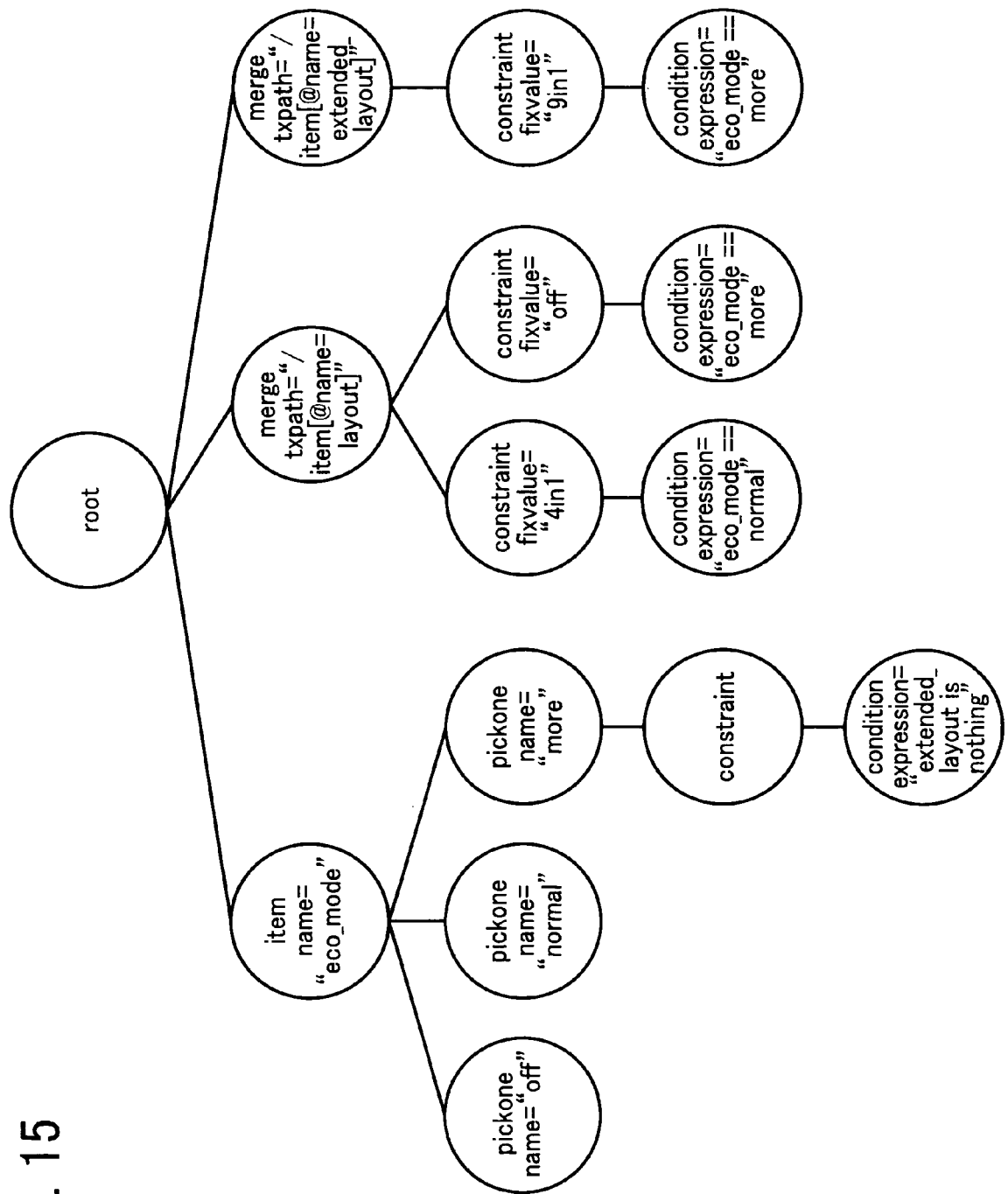
FIG. 15 is a schematic of a DOM tree corresponding to the function information for the eco-mode plug-in (FIG. 8).

FIG. 14 is a schematic of a DOM tree corresponding to the function information for the aggregation extending plug-in (FIG. 7), and FIG. 15 is a schematic of a DOM tree corresponding to the function information for the eco-mode plug-in (FIG. 8). These DOM trees not only have an item node, a pickone node, a constraint node, and a condition node, in the same manner as in the DOM tree corresponding to the function information for the core driver 111 (FIG. 6), but also a merge node corresponding to the "merge" tag.

Merging DOM Trees

Figure 16:
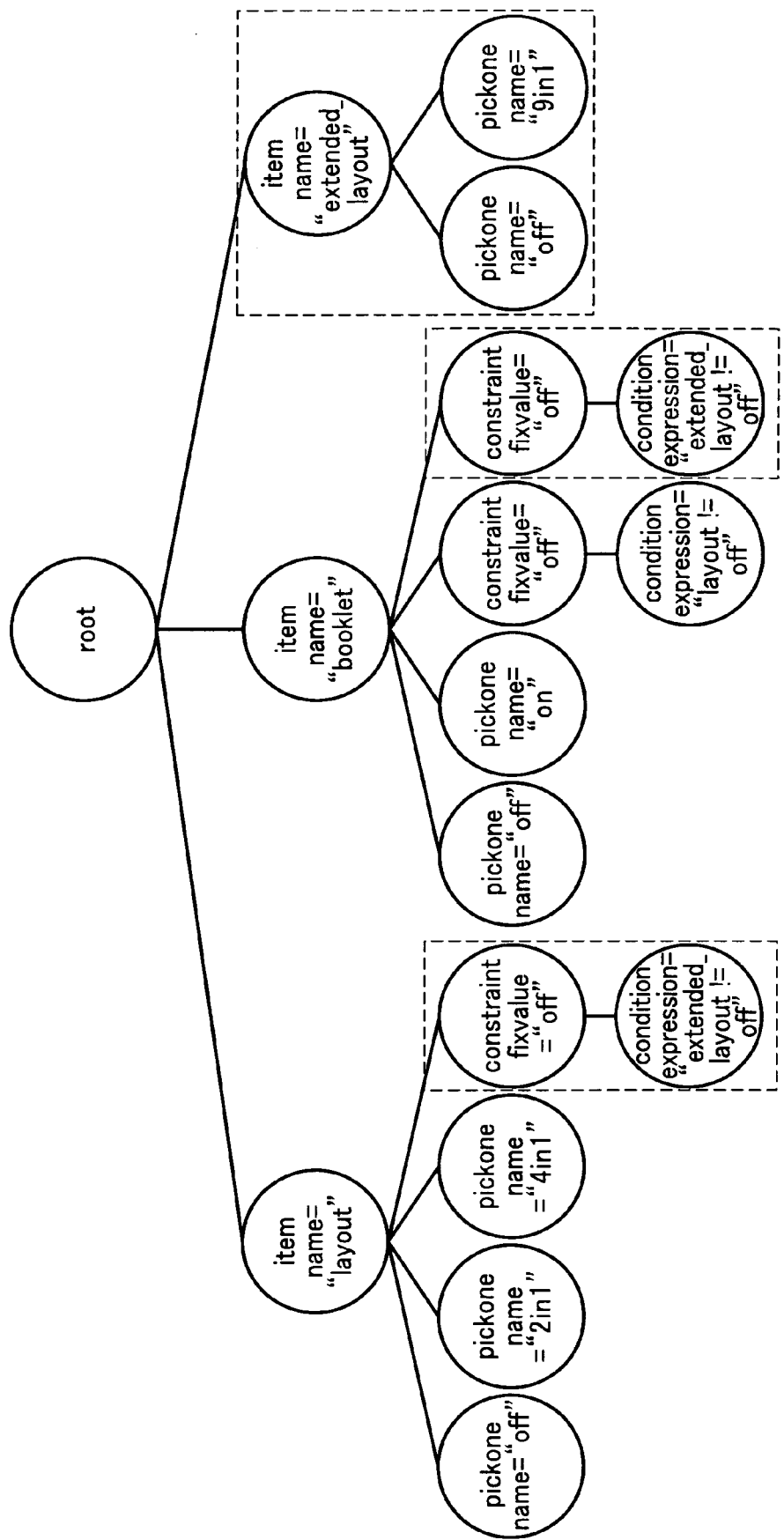
FIG. 16 is a schematic of a DOM tree resulting from merging the DOM tree B corresponding to the function information for the aggregation extending plug-in illustrated in FIG. 14 into the DOM tree A corresponding to the function information for the core driver illustrated in FIG. 13.

If a DOM tree B corresponding to the function information for the aggregation extending plug-in illustrated in FIG. 14 is merged into a DOM tree A corresponding to the function information for the core driver 111 illustrated in FIG. 12, a DOM tree illustrated in FIG. 16 is obtained (the parts surrounded by a dotted line represent the nodes having belonged to the DOM tree B). The item node having belonged to the DOM tree B is linked to the root node. On the contrary, the nodes having belonged to the merge nodes are linked to the item nodes having the name "layout" and the item node having the name "booklet", respectively, as illustrated in FIG. 16, in a corresponding manner.

Figure 17A:
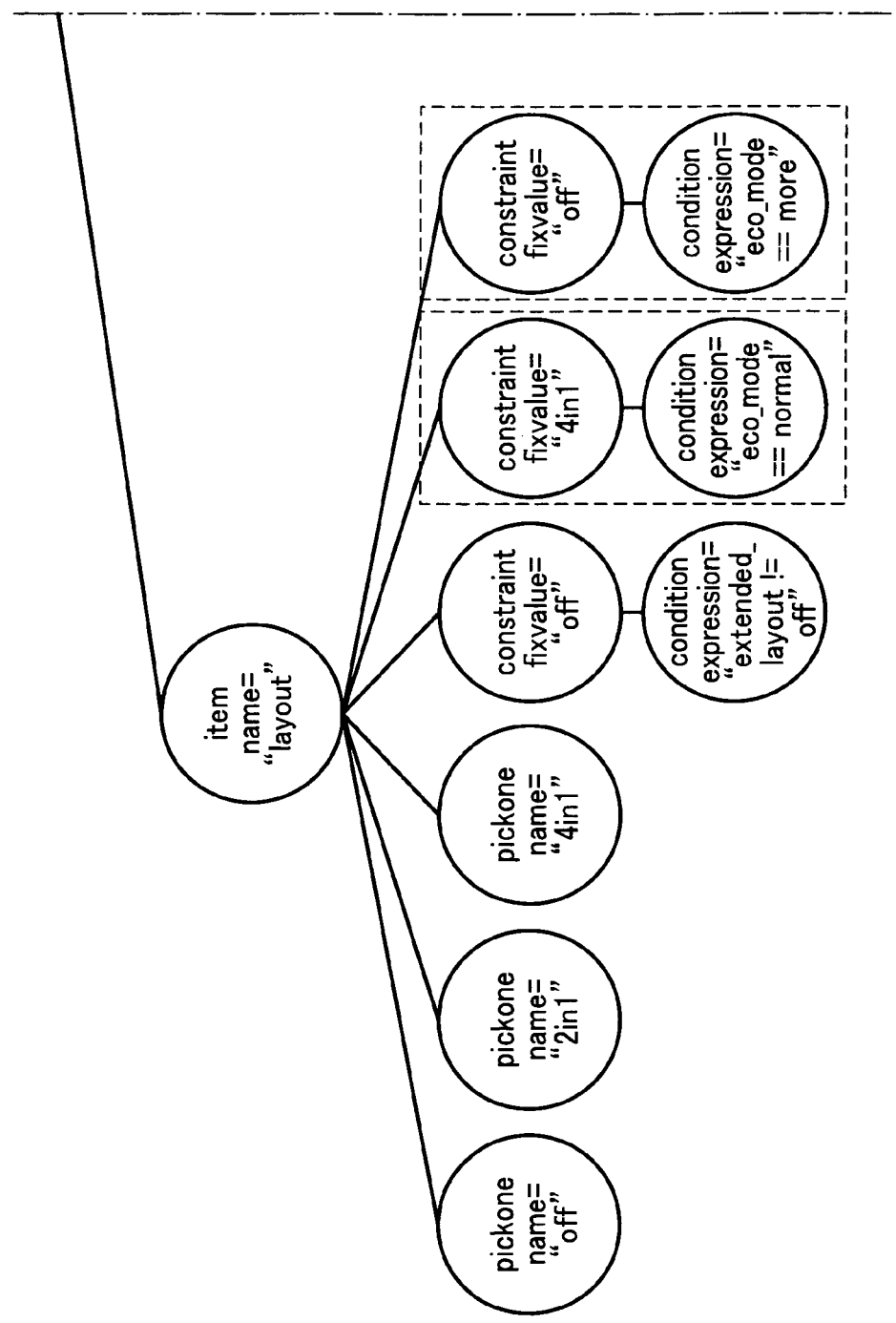
FIG. 17 is a schematic of a DOM tree resulting from merging the DOM tree C corresponding to the function information for the eco-mode plug-in into the DOM tree illustrated in FIG. 16.
Figure 17B:
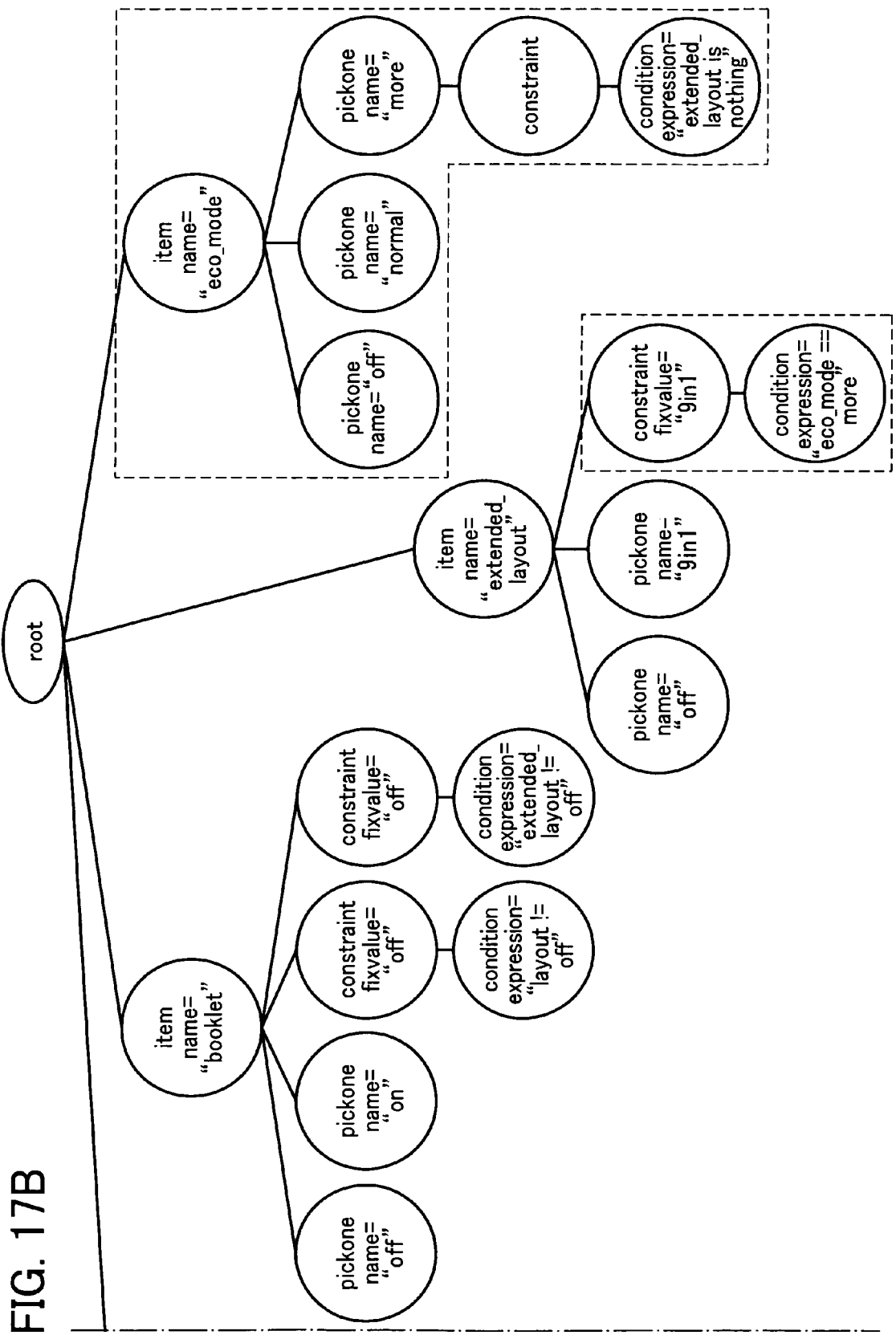

If a DOM tree C corresponding to the function information for the eco-mode plug-in is further merged into the DOM tree merged in the manner described above, a DOM tree illustrated in FIG. 17 is obtained (the parts surrounded by a dotted line represent the nodes having belonged to the DOM tree C). The item node having belonged to the DOM tree C is linked to the root node. On the contrary, the nodes having belonged to the merge nodes are linked to the item node having the name "layout" and the item node having the name "extended_layout", respectively, as illustrated in FIG. 17, in a corresponding manner.

Figure 18B:
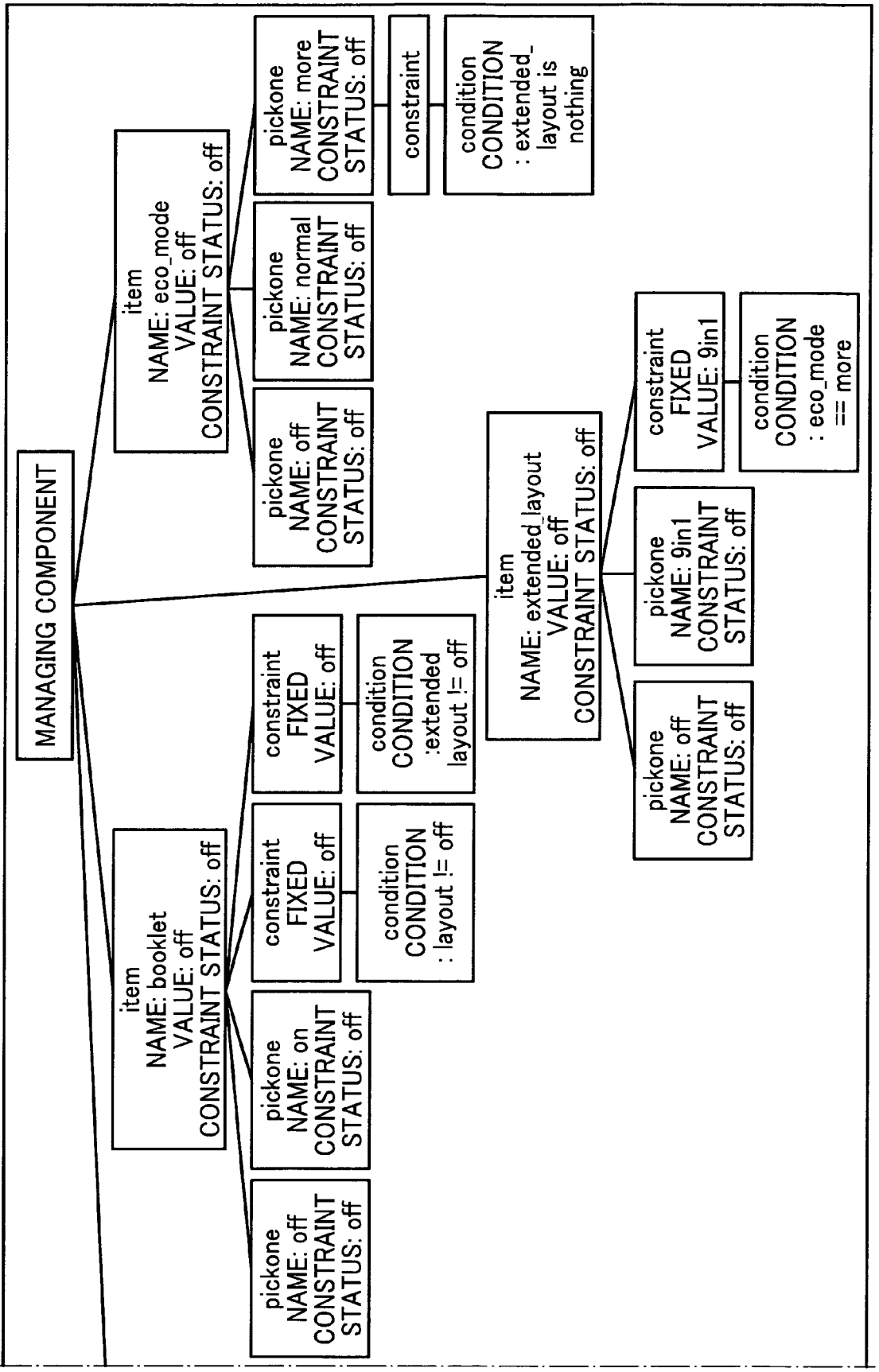
FIG. 18 is a schematic of each component generated as the setting managing module.

Based on the DOM tree thus generated, each of the components in the setting managing module 123 illustrated in FIG. 18 is generated as a class instance. The function of each of these components is as described above.

The constraint components in each of the plug-ins are added to the set of components corresponding to the aggregation and the binding functions, which are the original functions of the core driver 111. Therefore, the constraints for the function of each of the plug-ins can be applied to the aggregation and the binding. Furthermore, because the constraint component for the function of the eco-mode plug-in developed later in time is added to the set of components for the function of the aggregation extending plug-in developed earlier in time, the constraint in the function of the eco-mode plug-in can be applied to the extended aggregation.

Generating Components of Setting Managing Module 123

Figure 19:
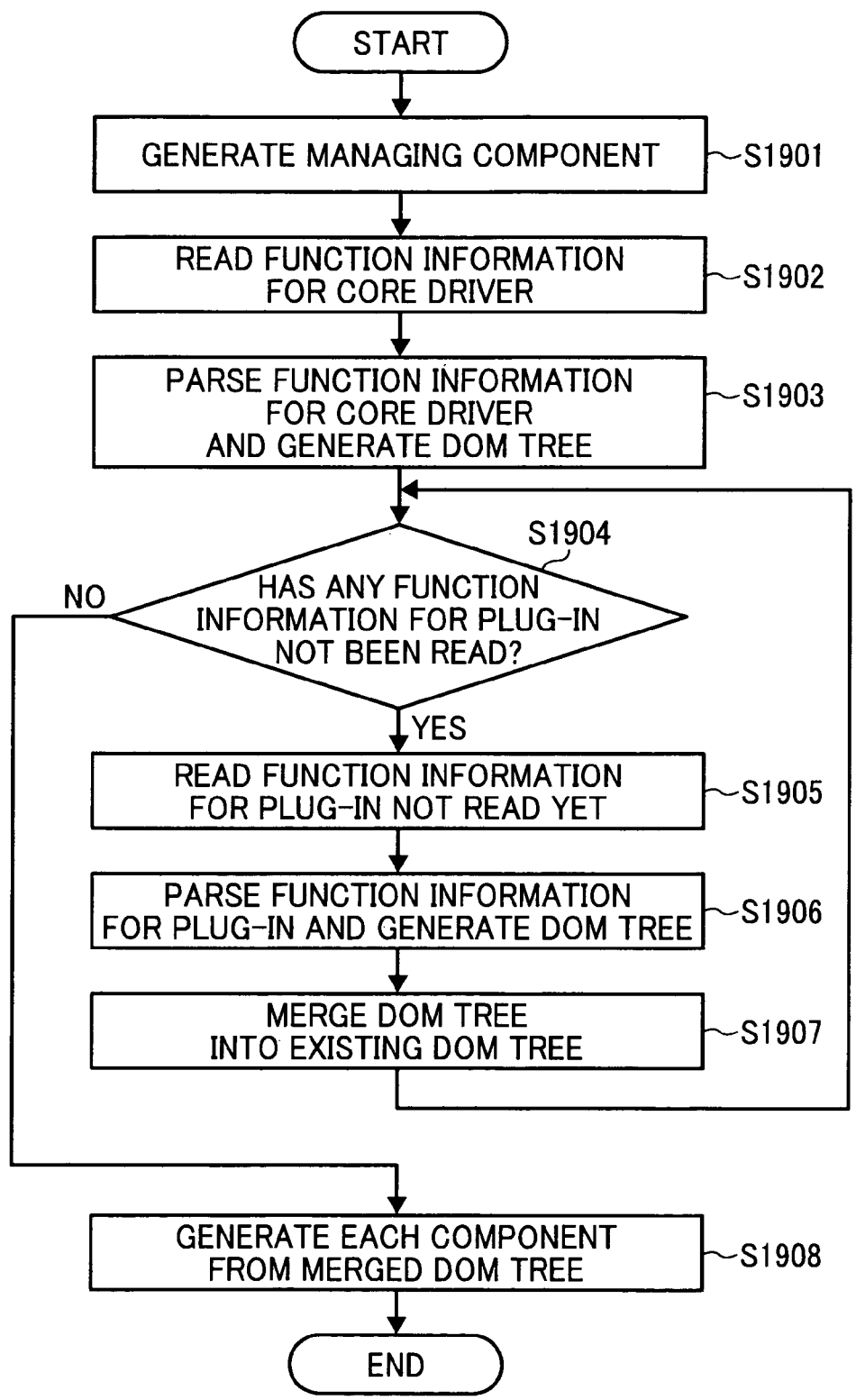
FIG. 19 is a flowchart of a process of generating the components of the setting managing module in the core driver.

A process of generating the components of the setting managing module 123 of the core driver 111 will now be explained with reference to FIG. 19.

To begin with, a function of the core driver 111 generates a class instance that is to be the managing component in the setting managing module 123 (Step S1901). At this time, the managing component is initialized.

The managing component generated at Step S1901 then reads the function information for the core driver 111 (Step S1902).

The managing component then analyzes (parses) the function information for the core driver 111 read out at Step S1902 using a DOM parser, and generates a DOM tree on the memory as a result of the analysis (Step S1903).

The managing component then determines if any function information for a plug-in has not been read yet. If some function information for a plug-in has not been read out yet (YES at Step S1904), the system control proceeds to Step S1905. If no function information for a plug-in is yet to be read out (NO at Step S1904), the system control proceeds to Step S1908.

At Step S1905, the managing component reads the function information for a plug-in having not been read yet and having the oldest generated date.

The managing component then analyzes (parses) the function information for the plug-in read out at Step S1905 using the DOM parser, and generates a DOM tree on the memory as a result of the analysis (Step S1906).

The managing component then merges the DOM tree generated at Step S1906 into an existing DOM tree (Step S1907).

The "existing DOM tree" herein means a DOM tree generated immediately before Step S1907. In other words, the "existing DOM tree" means the DOM tree generated at Step S1903 when Step S1907 is executed for the first time, and means the DOM tree after a merge is performed at a step before Step S1907, for the times thereafter.

At Step S1908, the managing component generates each of the components of the setting managing module 123 as a class instance from the DOM tree that is a result of merging the DOM tree corresponding to the function information for the core driver 111 and from the DOM trees corresponding to the function information for all of the plug-ins, based on information therein. At this time, each of the components is generated as components (class instances) having a parent-and-child relation indicated by the DOM tree after merging is completed.

As described above, each of the components in the setting managing module 123 of the core driver 111 is generated.

Operation Performed by Setting Managing Module 123

Figure 20B:
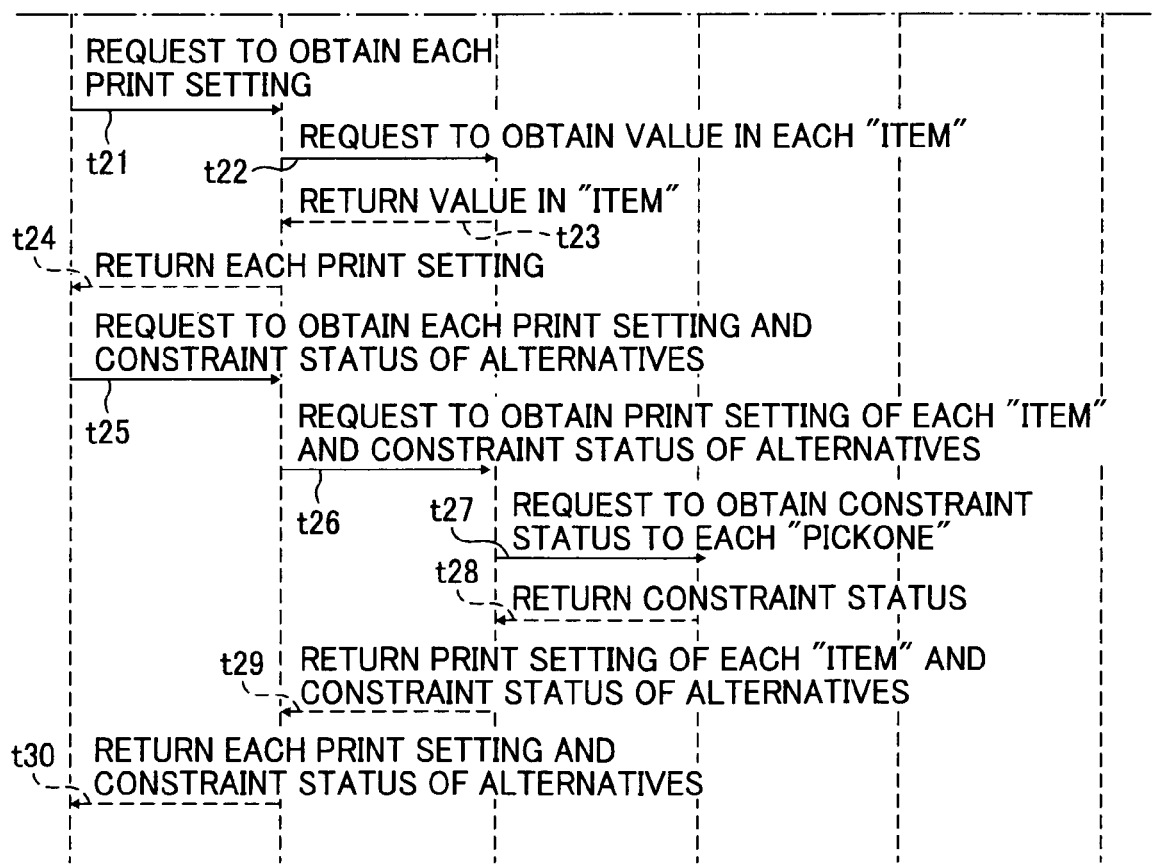
FIG. 20 is a sequence diagram of operations performed by the respective components of the setting managing module in response to a request, e.g., a print setting request, issued by another module.

The constraining process performed by the setting managing module 123 of the core driver 111, that is, the process performed by each of the components in the setting managing module 123, will now be explained with reference to FIG. 20. FIG. 20 is a sequence diagram of operations performed by the respective components included in the setting managing module 123, in response to a request, e.g., a print setting request, issued by another module.

To begin with, a module (for example, the window displaying module 121) sets a print setting value to the managing component acting as an interface with the other modules (t1).

The managing component then sets the print setting value received from the module in each of the item components (t2).

The managing component then issues a request to cause each of the item components to update its constraint status, in the order indicated by the value in their priority attributes (in the ascending order, in this embodiment) (t3).

Each of the item components issues a request to the pickone component that is a child component belonging thereto to update the constraint status in the pickone component (t4).

The pickone component then issues a request to the constraint component to obtain constraint judgment information (information about whether the value matches the constraint) (t5).

In response to this request, the constraint component inquires a child condition component belonging thereto if the value in the item component (setting value) satisfies the condition specified in the condition component (t6).

In response to this inquiry, the condition component issues a request to the corresponding item component so as to obtain the value set in the item component and required in making the judgment about the condition specified therein (t7). At this time, if such an item component is not in the direct parent-and-child relation, the condition component issues a request to the item component via the managing component.

In response to the request, the item component returns the value to the requesting condition component (via the managing component if the request is received via the managing component) (t8).

The condition component judges whether the value returned by the item component satisfies the condition specified in the condition component itself, and returns the judgment result to the constraint component that made the request for the judgment (t9).

Based on the result of the judgment received from the condition component, the constraint component returns information indicating that the value matched the constraint (corresponding to constraint status: on) and a fixed value (fixvalue), or information indicating that the value did not match the constraint (corresponding to constraint status: off), that is, constraint judgment information, to the pickone component (t10).

The pickone component, receiving the constraint judgment information, updates the constraint status in the pickone component itself based on the constraint judgment information received from the constraint component (til), and then returns the constraint status to the parent item component (t12).

If an item component has a constraint component as a child, for example, like the item component having the name "booklet" as illustrated in FIG. 13, the item component issues an order to the child constraint component so as to obtain the constraint judgment information (t13).

In response to this order, the constraint component makes an inquiry to the child condition component as to whether the value in the parent item component satisfies the condition specified in the condition component (t14).

In response to this inquiry, the condition component issues a request to the corresponding item component so as to obtain the value set in the item component that is needed for making the judgment about the condition specified in the condition component itself (t15). At this time, if such an item component is not in the direct parent-and-child relation, the condition component issues the request to the item component via the managing component.

In response to the request, the item component returns the value to the condition component (via the managing component if the request is received via the managing component) (t16).

The condition component judges whether the value returned by the item component satisfies the condition specified in the condition component itself, and returns the judgment result to the constraint component that made the request for the judgment (t17).

Based on the result of the judgment received from the condition component, the constraint component returns information indicating that the value matched the constraint (corresponding to constraint status: on) and a fixed value, or information indicating that the value did not match the constraint (corresponding to constraint status: off), that is the constraint judgment information, to the parent item component (t18).

By means of such a process, the item component updates the constraint status thereof (t19) and the value thereof (current value) (t20) based on the constraint status of the child pickone component and the constraint judgment information received from the child constraint component.

If another module issues a request to the managing component so as to obtain each of the print setting values (t21), the managing component issues a request to each of the item components to obtain the values (t22).

The item components receiving the request return the value set therein to the managing component (t23), and the managing component returns the values received from the respective item components to such a module as the print setting values (t24).

When the managing component receives a request for obtaining the each of the print settings and the constraint status of the alternatives for the print settings from another module (for example, the window displaying module 121) (t25), the managing component issues a request to each of the item components to obtain the print settings and the constraint status of the alternatives (t26).

Each of the item components, having received the request from the managing component, issues a request to each of the child pickone components to obtain the constraint status thereof (t27).

In response to the request, each of the pickone components returns the constraint status thereof to the parent item component (t28).

Each of the item components receiving the constraint status from the child pickone component returns the print settings and the constraint status in the alternatives to the managing component (t29).

The managing component returns the print settings and the constraint status of the alternatives received from each of the item components to the module that made the obtaining request (t30). For example, the window displaying module 121, which is one of the other modules, can use this information to display a GUI corresponding to the constraint status. The sequence illustrated in FIG. 20 is just an example for explaining the operations performed between the components, and is not limited thereto.

As explained above, in the printer driver 106 according to the embodiment (the core driver 111 and the plug-ins), any constraints can be added to the functions and the settings of the core driver 111 and each of the plug-ins, regardless of the time when the core driver 111 and each of the plug-ins were developed. Furthermore, because the function information for the core driver 111 and the function information for each of the plug-ins, which are used in the manner described above, are stored and managed as independent files; when a plug-in is to be uninstalled, each file making up the function information can simply be removed, even if the function information contains constraints that are interrelated to each other in a complex manner. Therefore, un-installation can also be performed easily.

The computer programs for the core driver and the plug-in according to the embodiment are stored and made available in an installable or an executable format in a computer-readable recording medium such as a compact disk read-only memory (CD-ROM), a flexible disk (FD), a compact disk recordable (CD-R), or a digital versatile disk (DVD).

These computer programs may also be stored in a computer connected to a network such as the Internet, and made available for download over the network.

According to the present invention, any constraints on functions or settings of a core driver and each of the plug-ins can be specified freely regardless of the time when the core driver and each of the plug-ins were developed. Furthermore, the function information for the core driver and the function information for each of the plug-ins are stored in independent files, whereby the core driver and the plug-ins can be uninstalled easily.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A non-transitory computer-readable recording medium comprising computer-readable program codes for a printer driver including a core driver, the core driver performing a constraining process to a print setting based on function information containing a constraint for the print setting stored in a storing unit, that when executed on a computer cause the core driver to perform operations, wherein:

the core driver expands basic function information that corresponds to the core driver on a memory as first level information in a manner maintaining architectural relation of the basic function information, wherein
the basic function information includes, in a child level of function information that indicates a basic function that is included in the core driver, descriptions of
setting value information indicating a setting value that is selectable of the basic function indicated by the function information, and
constraint information indicating constraint processing about the basic function indicated by the function information;
the core driver expands plug-in function information that corresponds to a plug-in on the memory as second level information in a manner maintaining architectural relation of the plug-in function information,
the plug-in function information includes descriptions of
setting value information indicating a setting value that is selectable of expansion function indicated by the function information in a child level of function information indicating the expansion function that is included in the plug-in,
constraint information indicating constraint processing about the basic function included in the core driver in a same level of the setting value information, and
combining information that indicates the basic function applied with constraint processing indicated by the constraint information on a parent level of the constraint information;
the core driver combines the first level information expanded from the basic function information with the second level information expanded from the plug-in function information in a manner where
information in a level same or under the child level of the combination information described in the plug-in function information becomes information in a level same or under the child level of the function information indicating the basic function designated by the combination information,
the function information being described in the basic function information; and
the core driver performs constraint processing to the print setting based on the first level information that is combined with the second level information.

2. The non-transitory computer-readable recording medium according to claim 1, wherein
the basic function information includes, in the child level of the constraint information, condition information indicating condition on which the constraint processing indicated by the constraint information is performed, and
the plug-in function information has a description of condition information, on the child level of the constraint information, that indicates condition on which constraint processing indicated by the constraint information is performed, the condition being related to the expansion function included in the plug-in.

3. The non-transitory computer-readable recording medium according to claim 1, wherein
the core driver includes a setting control unit, in the first level information which is combined with the second level information, that generates software component group that provides parent level with information that child level has and/or that is received from the child level,
a control unit, among the software component group, is located at an uppermost level in the first level information which is combined with the second level information,
works as an interface to other module constituting core driver, and
performs constraint processing of print setting based on information obtained from each of the software components that are the child level thereof.

4. The non-transitory computer-readable recording medium according to claim 1, wherein the core driver includes a setting managing module, the setting managing module uses a Document Object Model (DOM) parser to expand the function information described in an Extensible Markup Language (XML) format as a DOM tree on the memory.

5. An information processing apparatus, comprising:
a memory installed with a printer driver including a core driver performing a constraining process to a print setting based on function information, containing a constraint for the print setting and stored in a storage unit of the information processing apparatus, and being enabled to accept an addition of a plug-in, and
a processor configured to implement the printer driver such that:
the core driver expands basic function information corresponding to the core driver on a memory as first level information in a manner maintaining architectural relation of the basic function information, wherein
the basic function information includes, in a child level of function information that indicates a basic function that is included in the core driver, descriptions of
setting value information indicating a setting value that is selectable of the basic function indicated by the function information, and
constraint information indicating constraint processing about the basic function indicated by the function information;
the core driver expands plug-in function information that corresponds to a plug-in on the memory as second level information in a manner maintaining architectural relation of the plug-in function information,
the plug-in function information includes descriptions of
setting value information indicating a setting value that is selectable of expansion function indicated by the function information in a child level of function information indicating the expansion function that is included in the plug-in,
constraint information indicating constraint processing about the basic function included in the core driver in a same level of the setting value information, and
combining information that indicates the basic function applied with constraint processing indicated by the constraint information on a parent level of the constraint information;
the core driver combines the first level information expanded from the basic function information with the second level information expanded from the plug-in function information in a manner where information in a level same or under the child level of the combination information described in the plug-in function information becomes information in a level same or under the child level of the function information indicating the basic function designated by the combination information, the function information being described in the basic function information; and the core driver performs constraint processing to the print setting based on the first level information that is combined with the second level information.

6. The information processing apparatus according to claim 5, wherein the basic function information includes, in the child level of the constraint information, condition information indicating condition on which the constraint processing indicated by the constraint information is performed, and the plug-in function information has a description of condition information, on the child level of the constraint information, that indicates condition on which constraint processing indicated by the constraint information is performed, the condition being related to the expansion function included in the plug in.

7. The information processing apparatus according to claim 5, wherein the core driver includes a setting control unit, in the first level information which is combined with the second level information, that generates software component group that provides parent level with information that child level has and/or that is received from the child level, a control unit, among the software component group, is located at an uppermost level in the first level information which is combined with the second level information, works as an interface to other module constituting core driver, and performs constraint processing of print setting based on information obtained from each of the software components that are the child level thereof.

8. The information processing apparatus according to claim 5, wherein the core driver includes a setting managing module, the setting managing module uses a Document Object Model (DOM) parser to expand the function information described in an Extensible Markup Language (XML) format as a DOM tree on the memory.

* * * * *